Jan. 25, 1955     G. R. BLACKMAN     2,700,528
VALVE ASSEMBLY

Filed March 19, 1951     3 Sheets-Sheet 1

Glenn R. Blackman
INVENTOR.

BY Charles E. Lightfoot

ATTORNEY

Jan. 25, 1955
G. R. BLACKMAN
2,700,528
VALVE ASSEMBLY
Filed March 19, 1951
3 Sheets-Sheet 2
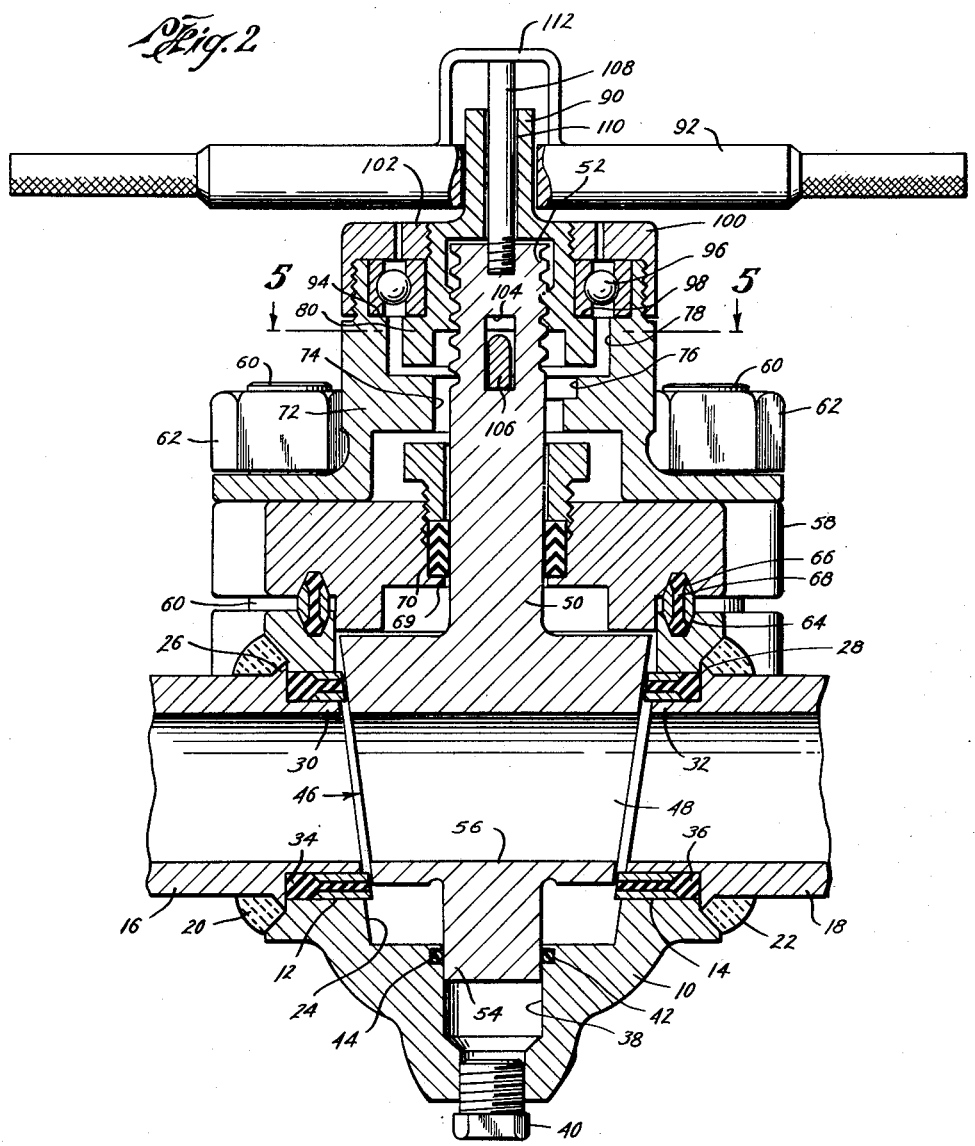
Glenn R. Blackman
INVENTOR.
BY Charles E. Lightfoot
ATTORNEY Jan. 25, 1955  G. R. BLACKMAN  2,700,528
VALVE ASSEMBLY
Filed March 19, 1951  3 Sheets-Sheet 3
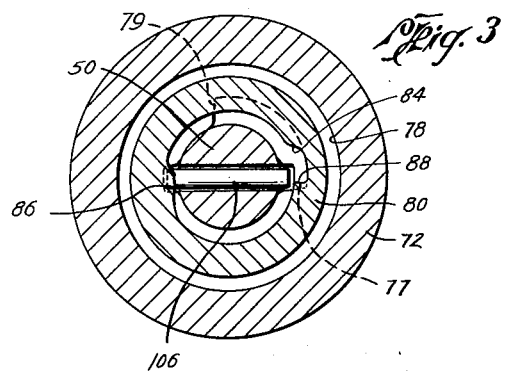
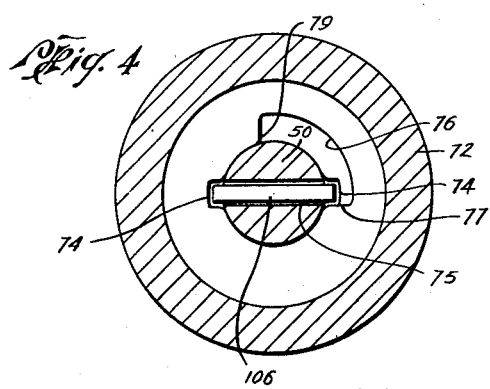
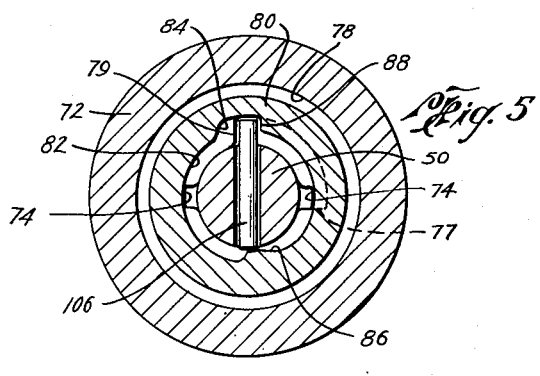
Glenn R. Blackman
INVENTOR.
BY
Charles E. Lightfoot
ATTORNEY

United States Patent Office 2,700,528
Patented Jan. 25, 1955

2,700,528

VALVE ASSEMBLY

Glenn R. Blackman, Houston, Tex.

Application March 19, 1951, Serial No. 216,438

6 Claims. (Cl. 251—166)

This invention relates to an improved valve assembly, and more particularly to a valve assembly in which a valve of the rotary plug type is employed and wherein the plug or valve body is adapted to rotate only when out of contact with the valve seat.

In valves of the type referred to, it has been customary, heretofore, to provide an assembly in which a valve plug is closely fitted into the valve seat and rotates in engagement with the seat when the valve is opened and closed. Such a valve structure presents the disadvantage that the engaging surfaces are subject to rapid wear, necessitating frequent replacement of the parts, and the valve and valve seat must also be accurately fitted to secure perfect contact and avoid leakage.

It is an important object of the present invention to provide a valve assembly of the rotary plug type, constructed to prevent wear due to rotation of the valve in contact with the valve seat.

Another object of the invention is the provision of a valve assembly of the type referred to, wherein the valve is maintained out of contact with the valve seat during rotation of the valve, while the same is being opened or closed.

A further object of the invention is to provide a plug valve assembly in which wear between the valve and valve seat, resulting from rotation of the valve in contact with the seat, is eliminated.

A further object of the invention is the provision of a plug valve assembly in which the valve is adapted to move out of contact with the valve seat, upon opening movement of the valve, without resulting in undesirable leakage between the valve and valve seat.

A still further object of the invention is to provide a valve assembly of the plug type in which the parts may be quickly and easily removed and replaced for purposes of maintenance and repair.

The above and other objects and advantages of the invention will best be understood from the following detailed description, constituting a specification of the same, when taken in conjunction with the annexed drawings wherein—

Figure 2 is a view similar to Figure 1, showing the valve in open condition;

Figure 3 is a cross-sectional view taken along the line 3—3 of Figure 1, looking in the direction indicated by the arrows;

Figure 4 is a cross-sectional view taken along the line 4—4 of Figure 1, looking in the direction indicated by the arrows; and Figure 5 is a cross-sectional view taken along the line 5—5 of Figure 2, looking in the direction indicated by the arrows.

Figure 1:
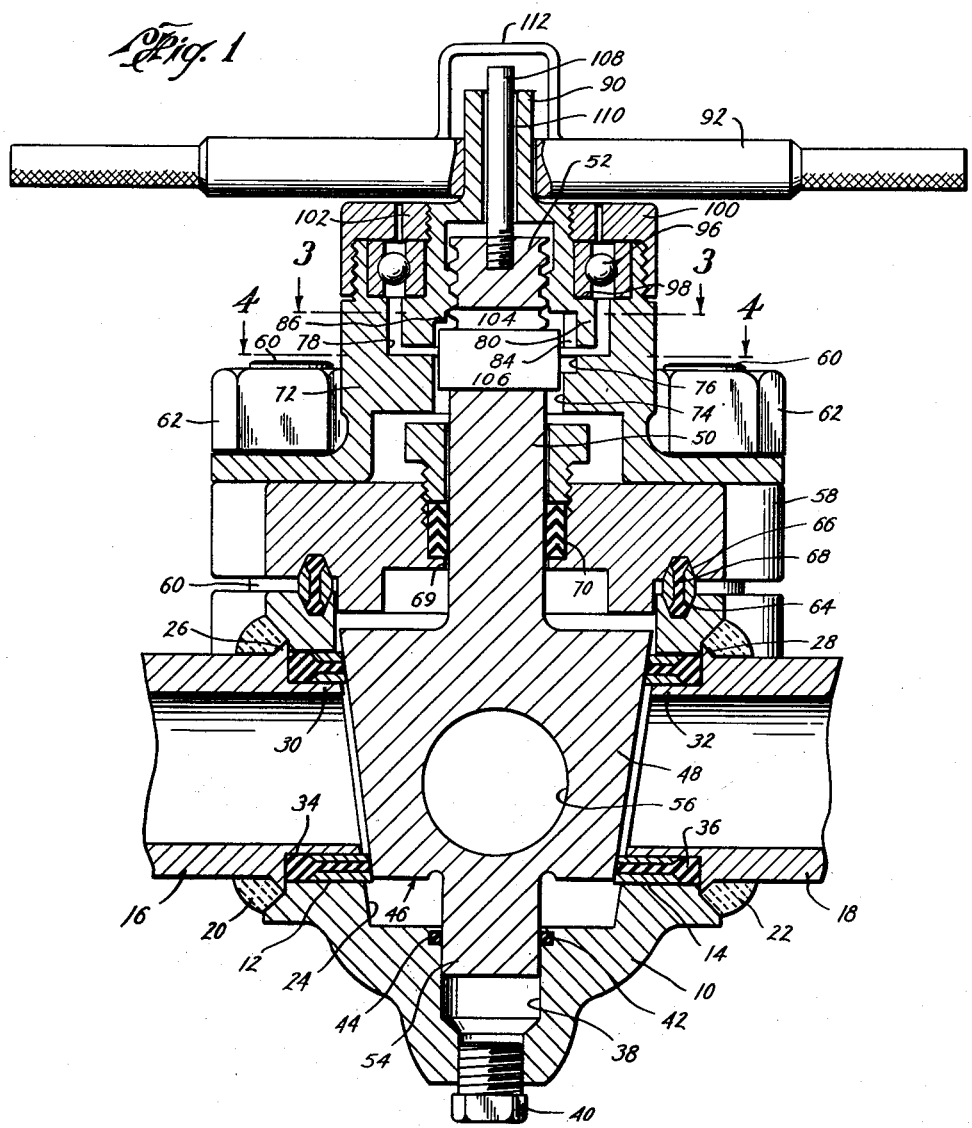
Figure 1 is a vertical central cross-sectional view of the invention, showing the valve in closed position.

Referring now to the drawings in greater detail, wherein like numerals of reference designate the same parts throughout the several views, the numeral 10 indicates the valve casing as a whole, which in the present illustration is formed with opposite openings 12 and 14, respectively, within which tubular connector members 16 and 18, respectively, extend, these members being secured to the casing in any convenient manner, as by welding as indicated at 20 and 22, respectively. Within the valve casing there is a valve receiving bore 24, with which the tubular members communicate, and which in the present instance is shown as formed with a downward and inward taper. The openings 12 and 14 and the bore 24 provide a flowway through the casing which flowway is controlled by a valve, described in detail hereinafter, having a passageway adapted to be moved into or out of registration with the tubular members 16 and 18.

The tubular members 16 and 18 are conveniently formed with outwardly extending annular flanges 26 and 28, respectively, forming shouldered portions which are adapted to engage the valve casing about the openings 12 and 14 therein, whereby the members may be centrally positioned in the opening and welded to the casing. At their inner ends, tubular members 16 and 18 are formed with portions of reduced diameter 30 and 32 respectively, which form with the openings 12 and 14 annular recesses adapted to receive packing elements, 34 and 36, respectively, which extend beyond the tubular members into the bore 24, for a purpose later to be made apparent.

The casing is also provided with a cavity 38, opening at its inner end into the bore 24, and internally threaded at its outer end to receive a suitable removable closure, such as the screw plug 40. Adjacent its inner end the cavity 38 has an internal groove 42, adapted to receive suitable packing means, such as an O-ring indicated at 44.

A valve body 46 is received in the casing, and has an enlarged tapered portion 48 fitting into the bore 24 of the casing, and an upwardly extending stem 50 having a portion 52 at its upper end, which is provided with an external left-hand thread. A projection 54 extends from the valve body 46, opposite the stem 50, which projection fits into the cavity 38 of the casing, and is engaged by the O-ring 44 to form a seal between the projection and casing.

The valve body 46 has a passageway 56 extending therethrough, which is adapted to be brought into registration with the tubular members 16 and 18, when the valve is in open position, and which is moved out of communication with said members when the valve is in closed condition, as seen in Figure 2 of the drawings. The enlarged tapered portion 48 of the valve body engages the packing elements 34 and 36 within the bore 24, to form a seal between the valve body and the casing about the openings 12 and 14 in the casing.

The bore 24 of the casing is closed by a bonnet 58, seated on the casing and retained thereon by suitable fastening means such as the studs 60 attached to the casing, and whose outer ends are threaded to receive the nuts 62. An annular groove 64 is formed in the casing, surrounding the bore 24, and a complementary groove 66 is formed in the bonnet, facing the groove 64, and suitable packing means, such as the packing ring 68 is disposed in the groove to form a fluid type seal between the bonnet and casing. The bonnet has an opening 69 therethrough, through which the stem 50 extends, and is provided with a suitable packing such as that indicated at 70 surrounding the stem 50, whereby a fluid type seal is formed between the bonnet and the stem.

Seated on the bonnet 58, and secured thereto by the studs 60, there is an actuator housing member 72, through which the stem 50 extends.

The actuator housing has a vertical slot 74 therethrough, and an arcuate cavity 76 into which the vertical slot opens, and the housing is also formed with an annular recess 78 above the slot 74 and cavity 76, for the reception of the lower end of an actuator member 80. One end wall 77 of the cavity 76 forms a vertical continuation of a wall 75 of the slot 74 as best seen in Figure 4. The other end wall 79 of the cavity 76 is remote from the slot 74 and in the present illustration is disposed at substantially 90° to the wall 75 of the slot.

Actuator member 80 is provided with a recess 82, therein, within which recess inwardly extending cam surfaces 84 and 86, respectively, are formed, for a purpose later to be made apparent. Spaced circumferentially from the camming surface 84 in the recess 82 there is also provided an abutment shoulder 88, whose purpose will be more fully explained hereinafter. The actuator member 80 is threadably received on the upper end of the stem 50, and is provided with an upper polygonal end projection 90, for cooperation with a handle, such as that indicated at 92, having a polygonal opening fitting over the projection 90, and by which the actuator member may be rotated.

The actuator housing 72 also has an internal annular shoulder 94, formed therein, upon which suitable bearing means 96, such as a ball bearing assembly is seated, and the actuator member 80 has an external annular shoulder 98 adapted to be disposed in horizontal alignment with the internal shoulder 94, and upon which the bearing 96 also rests.

The upper end of the actuator housing is externally threaded, and a cap 100, which is internally threaded is fitted on the housing, said cap extending inwardly over the bearing 96, to retain the same in position. The actuator member 80 extends through the cap 100, and has a collar 102 threadably attached thereto, which collar also engages the bearing 96, so that the actuator member is rotatably carried by the bearing, and may be freely rotated within the actuator housing.

The stem 50 has a laterally extending slot 104 therethrough, for the reception of a pin 106, which extends laterally beyond the stem, within the recess 82 in the actuator member 80, and which may also move in the slot 74 and the cavity 76 in the actuator housing during the operation of the valve, in a manner to be described hereinafter.

There is an indicator rod 108, attached to the upper end of the stem 50, which rod passes through an opening 110 in the projection 90, and the handle 92 is provided with a yoke 112, which extends over the projection 90, so that the position of the valve may be seen by the relationship of the upper end of the rod 108 to the top of the yoke 112.

The valve is shown in closed position in Figure 1, in which position passageway 56 is out of communication with the tubular members 16 and 18, and the key 106 is in the slot 74 in the actuator housing, so that the stem 50 cannot rotate, but will be moved vertically upwardly upon rotation of the actuator member 80 by the handle 92, thereby moving the valve body away from seated position in the tapered bore 24 without rotating the valve body. When the valve stem has thus been moved vertically upwardly a distance sufficient to bring the pin 106 opposite the cavity 76 in the actuator housing, the pin will then be engaged by the cam 86, upon further rotation of the actuating member to the left, thereby forcing the pin laterally with relation to the stem into the cavity 76. With the pin extending into the cavity 76 the pin will also engage the shoulder 88, as best seen in Figure 5 of the drawings, whereupon further rotation of the actuator member to the left will cause the stem 50 to move with the actuator, and the valve body will be rotated until the passageway 56 is in registry with the tubular members 16 and 18, thus bringing the valve to open position.

It will be noted that the valve body in moving to open position may be rotated only to the extent of the cavity 76 in the actuator housing, which is preferably substantially 90°, and the pin 106 will be then in engagement with the end wall 79 of the cavity, which prevents further rotation of the valve body to the left.

In order to close the valve the handle 92 is rotated to the right, and the stem will thereby be turned with the actuator member until the stem has moved to the right a distance sufficient to bring the pin 106 into engagement with the end wall 77 of the cavity 76, whereupon further movement of the actuator member to the right will cause the cam 84 to move the pin laterally of the stem out of the cavity 76 and into alignment with the slot 74 in the actuator housing. After the pin 104 has been moved into alignment with the slot 74, the pin will enter the slot upon further rotation of the actuator member to the right, and the stem will be moved vertically downwardly by further rotation of the actuator member, thus moving the valve body into seating engagement in the bore 24 in the closed position of the valve. By this operation the passageway 56 will be moved out of registry with the tubular members 16 and 18, thus closing the valve, and the valve will then be moved into sealing engagement with the packing elements 12 and 14.

It will thus be seen that the invention provides a valve assembly wherein the valve body is moved away from its seat in the valve casing, before rotation of the valve body takes place, and that the valve is rotated to closed position, before being seated in the casing, thus assuring that the valve body does not rotate when in engagement with its seat.

In the event that foreign matter, such as sand, mud, drill cuttings, or the like become lodged in the bore 24 of the valve casing, the valve body will not be prevented from closing, and excessive wear on the valve body will not be caused by grinding of such foreign matter between the valve and its seat. Should foreign material become lodged in the bore 24 of the valve casing, the valve body may be readily removed by removing the bonnet 58, along with the valve body and actuator mechanism, and the plug 40 may also be removed from the valve casing, after which the bore 24 may be flushed out in any desired manner.

The invention has been disclosed in connection with a particular embodiment of the same, but it will be understood that this is by way of illustration only, and numerous changes can be made in the construction and arrangement of the various parts without departing from the spirit of the invention, or the scope of the appended claims.

Having thus clearly shown and described the invention what is claimed as new and desired to secure by Letters Patent is:

1. In a valve assembly the combination with a valve casing having a flowway therethrough and a plug in the casing and having a transverse passageway therethrough and turnable into an open position to align the plug passageway with the flowway and into a closed position out of said alignment to close the flowway, said plug being also axially movable transversely of the flowway, of an actuating member rotatably mounted on the casing, and having a threadable connection with the plug for moving the plug axially upon rotation of said member, pin means carried by the plug and rotatable therewith, said pin means being movable from a first position out of engagement with said actuating member into a position in engagement with said actuating member to cause said plug to rotate with said member, and abutment means on the casing engageable with said pin means when in said first position to limit rotation of said plug.

2. In a valve assembly the combination with a valve casing having a flowway therethrough, a plug in the casing and having a passageway therethrough and turnable into an open position to align the plug passageway with the flowway and into a closed position out of said alignment to close the flowway, said plug being also axially movable transversely of the flowway, and a stem on the plug, of an actuator member rotatably carried by the casing and having a threadable connection with the stem for moving the plug axially upon rotation of said member, pin means carried by the stem and rotatable therewith, said pin means being movable from a first position out of engagement with said actuator member into a position in engagement with said actuator member to cause said stem to rotate with said member, means on the actuator means engageable with said pin means to move said pin means into and out of said first position upon predetermined axial movement of said stem, and means on the casing engageable with said pin means for limiting rotation of said stem.

3. In a valve assembly the combination with a valve casing having a flowway therethrough, a plug in the casing and having a passageway therethrough and turnable into an open position to align the plug passageway with the flowway and into a closed position out of said alignment to close the flowway, said plug being also axially movable transversely of the flowway, and a stem on the plug, of an actuator member rotatably carried by the casing and threadably connected to the stem to move the stem and plug axially upon rotation of said member, and means carried by the stem and movable from a first position out of engagement with said member into a position in engagement with said member to cause said stem to rotate with said member.

4. In a valve assembly the combination with a valve casing having a flowway therethrough, a plug in the casing and having a passageway therethrough and turnable into an open position to align the plug passageway with the flowway and into a closed position out of said alignment to close the flowway, said plug being also axially movable transversely of the flowway, and a stem on the plug, of an actuator member rotatably carried by the casing and cooperable with the stem to move the plug axially upon rotation of the member, pin means movably carried by the stem and movable from a first position out of engagement with said actuator member into a position in engagement with the actuator member to cause the stem to rotate with the member, and abutment means on the casing engageable with said pin means to limit rotation of the plug.

5. In a valve assembly the combination with a valve casing having a flowway therethrough, a plug in the casing and having a passageway therethrough and turnable into an open position to align the plug passageway with the flowway and into a closed position out of said alignment to close the flowway, said plug being also axially movable transversely of the flowway, and a stem on the plug, of an actuator housing on the casing, an actuator member rotatably carried by the housing and threadably connected with the stem to move the plug axially upon rotation of the member, and means movable with the stem from a first position out of engagement with said actuator member into a position in engagement with the member upon rotation of the stem in one direction to cause the stem to rotate with the member, said means being interengageable with the housing and stem to hold the stem against rotation during said axial movement.

6. In a valve assembly the combination with a valve casing having a flowway therethrough, a plug in the casing and having a passageway therethrough and turnable into an open position to align the plug passageway with the flowway and into a closed position out of said alignment to close the flowway, said plug being also axially movable transversely of the flowway, and a stem on the plug, of an actuator housing on the casing surrounding the stem, an actuator member rotatably mounted on the housing and threadably connected with the stem to move the plug axially, and means movable with the stem from a first position out of interengagement with the stem and housing into a second position in interengagement with the stem and housing upon axial movement of the stem in one direction to hold the stem against rotation, said means being movable from said second position into said first position to cause said stem to rotate with said member to rotate said plug upon axial movement of the stem in the other direction.

References Cited in the file of this patent

UNITED STATES PATENTS

| Number | Name | Date |
|---|---|---|
| Re. 18,244 | Stevens | Nov. 3, 1931 |
| 514,180 | Coale | Feb. 6, 1894 |
| 1,084,185 | Whitehouse | Jan. 13, 1914 |
| 2,238,385 | Foster | Apr. 15, 1941 |
| 2,392,880 | Reed | Jan. 15, 1946 |
| 2,443,995 | Snyder | June 22, 1948 |
| 2,501,150 | Anderson | Mar. 21, 1950 |